United States Patent [19]

Rice et al.

[11] 4,304,870

[45] Dec. 8, 1981

[54] ABLATIVE-RESISTANT DIELECTRIC CERAMIC ARTICLES

[75] Inventors: Roy W. Rice; William J. McDonough, both of Alexandria, Va.; Stephen W. Freiman, Potomac, Md.; John J. Mecholsky, Jr., Albuquerque, N. Mex.

[73] Assignee: The United States of America as represented by the Secretary of the Navy, Washington, D.C.

[21] Appl. No.: 122,944

[22] Filed: Feb. 20, 1980

[51] Int. Cl.$^3$ .............................................. C04B 35/58
[52] U.S. Cl. ...................................................... 501/98
[58] Field of Search ........................... 106/73.4, 65, 55

[56] References Cited

U.S. PATENT DOCUMENTS

| | | | |
|---|---|---|---|
| 3,811,900 | 5/1974 | Fassell | 106/65 X |
| 3,852,078 | 12/1974 | Wakatsuki et al. | 106/65 X |
| 4,007,049 | 2/1977 | Rossi et al. | 106/65 X |
| 4,218,253 | 8/1980 | Dworak et al. | 106/73.4 |

FOREIGN PATENT DOCUMENTS

| | | | |
|---|---|---|---|
| 2549652 | 5/1977 | Fed. Rep. of Germany | 106/65 |
| 2717010 | 5/1978 | Fed. Rep. of Germany | 106/73.4 |
| 49-40121 | 10/1974 | Japan | 106/73.4 |
| 52-23114 | 2/1977 | Japan | 106/55 |
| 52-38514 | 3/1977 | Japan | 106/73.4 |
| 586166 | 3/1977 | Switzerland | 106/73.4 |

OTHER PUBLICATIONS

Rice; R. W. et al., "Thermal Structure Ceramic Composites", Ceram. Eng. and Sci. Proc., 1:7–8, pp. 424–443.
Sanders; W. A. et al., Report No. NASATN D-6890, "Evaluation of Oxidation Resistant Nonmetallic Materials at 1204° C. in a MACH 1 Burner".
Claussen; N., "Fracture Toughness of $Al_2O_3$ with an Unstabilized $ZrO_2$ Dispersed Phase", J. Am. Cer. Soc. 59:1–2, pp. 49–51, (1976).
Claussen; N. et al., "Effect of Induced Microcracking on the Fracture Toughness of Ceramics", Am. Cer. Soc. Bull. 56:6, pp. 559–562, (1977).

*Primary Examiner*—Helen M. McCarthy
*Attorney, Agent, or Firm*—R. S. Sciascia; A. L. Branning; T. E. McDonnell

[57] ABSTRACT

A tough, ablative-resistant, dielectric ceramic material is constructed using powder metallurgy techniques. The composite comprises a boron nitride particulate phase immersed in an $Al_2O_3$ matrix. The boron nitride particles are preferably 3–5 microns in size, and create the capability of sustaining thermal strains without generating the thermal stresses that lead to material failure. The composite displays superior mechanical strength characteristics.

6 Claims, No Drawings

ABLATIVE-RESISTANT DIELECTRIC CERAMIC ARTICLES

BACKGROUND OF THE INVENTION

This invention relates to ceramic composites that are tough, yet display exceptional resistance to thermal shock. More particularly, this invention relates to an alumina-boron nitride dielectric ceramic that displays superior mechanical as well as thermal shock and ablation resistance. Such a composite may be utilized as a structural material in the fabrication of radomes and antenna windows, missile and rocket components, and other related structures which encounter high temperatures during use and are not exposed to long periods of oxidation at extreme temperatures.

The fabrication of ceramic materials characterized by exceptional resistance to thermal shock, ablation, weather erosion, and the like has become a technology of significant importance. A number of materials have been suggested and tried in an attempt to find such a suitable material. For example, among the current conventional radome materials, alumina and "Pyroceram 9606", crystalline glass-like ceramic sold by Corning Glass, Inc., have been clearly demonstrated not to meet all these advanced requirements. Fused $SiO_2$, while having adequate resistance to thermal stress fracture, has inadequate ablation resistance due to its limited refractory character, as well as significant weather erosion deficiencies. $Si_3N_4$ has extreme thermal environment limitations, while boron nitride is extremely expensive as well as mechanically weak.

Important elements in improving a composite's thermal-stress resistance in extreme high-temperature environments are to reduce the thermal conductivity of the material and increase the strain tolerance. Introduction of a second phase material into the crystalline microstructure can significantly reduce the thermal conductivity of a material. The size and thermal conductivity of these second phase particles are extremely important composite parameters. In particular, the particle size and thermal conductivity of the second phase material determines the character of the immediate microstructure of the composite, i.e., the magnitude and number of microcracks which result upon thermal expansion of both composite materials when exposed to significant temperature fluctuations. Generation of microcracks is an important strain accommodating mechanism, and hence increases strain tolerance.

The prior art has attempted to solve the problem of increased resistance to thermal shock by placing the emphasis on inhibiting or arresting crack propagation. A recent theoretical evaluation, i.e., Rossi (*Thermal Shock-Resistant Materials*, in "Ceramics in Severe Environments", ed. N.Y. Planum press, 1971, pp. 132-134), discusses the theory of thermal crack propagation and prevention and evaluates a hot-pressed BeO matrix containing 10 volume percent of pyrolytic BN, creating a thermal-resistant, hypereutectic structure. However, the BN phase particles are much larger than the BN particles used in this composite, being platlets of 75-350 microns diameter and no unusual importance is attached to their exact size. In U.S. Pat. No. 4,007,049, Rossi et al., the alumina-boron nitride system is evaluated, but only for composites containing from about 5 to 30 volume percent of these large BN particles. Furthermore, the patent teaches that the incorporation of powdered boron nitride does not provide the necessary increase in thermal shock resistance which the dispersed phase having a flake morphology achieves.

SUMMARY OF THE INVENTION

In accordance with this invention, it has been found that the addition of fine boron nitride particles on the order of 3-5 microns, to an $Al_2O_3$ matrix forms a composite article which exhibits superior inhibition of crack propagation resulting from severe thermal conditions. The composite also exhibits improved mechanical toughness, ablation, and erosion resistance. The boron nitride particles are uniformly dispersed throughout the alumina matrix using conventional wet-powder processing techniques, and are processed into a highly internally bonded, hot-pressed ceramic composite.

Accordingly, the primary object of this invention is to produce a ceramic material that possesses a high degree of resistance to thermal shock as well as exhibiting superior mechanical toughness and erosion resistance properties.

Another object of this invention is to provide an alumina-boron nitride composite in which the magnitude of internal crack propagation has been inhibited in order to increase its resistance to mechanical fracture, yet retain its thermal shock resistance.

A further object of the invention is to discover the optimum particle-size geometry and component composition of an $Al_2O_3$-BN hot-pressed composite.

A still further object of this invention is to fabricate a dielectric material than can withstand an extreme thermal environment and be used as a radome or antenna window.

Other objects, advantages and novel features of the invention will become apparent from the following detailed description of the invention.

DESCRIPTION OF THE PREFERRED EMBODIMENT

The design of thermal-shock-resistant materials revolves around the concept of preventing crack propagation. Composite materials which have the ability to sustain thermal shock without generating the thermal stresses which lead to eventual material failure are in great demand. Several of these materials comprise two-phase particle mixtures, and an understanding of their microstructure is essential to an understanding to improving thermal and mechanical properties.

Several composites are formed from an inert "matrix" material having a second-phase material incorporated in particle form into the matrix, or first-phase material. If the thermal expansion characteristics of the second phase particles are greater than those of the matrix, and if the particles are made sufficiently large with respect to the differences in thermal expansion and elastic moduli between the particles and the matrix, cracking will occur around the particles, thus reducing the thermal conductivity of the composite but yet not significantly reducing the ablation resistance of the composite. Also, if the thermal expansion of the particle is lower than that of the chosen matrix, the matrix will develop cracks radiating out from the particle, which are effective in reducing thermal conductivity since there exists a greater projected area of interfaces to reduce the thermal conductivity. However, the size of the particles must be kept small enough so as to keep the associated microcracks small and keep the spacing of the particles large enough, control of their concentration, to prevent local microcracks from linking together and thus causing large cracks which lead to the failure of the composite. Microcracks will form for small particles only when there is a substantial mismatch in thermal expansion between the particles and the matrix.

Another important desired property for the composite material is high ablation resistance. This need is fulfilled by using materials comprised of compounds with low atomic numbers, since it is well known that the energy required to ablate a unit quantity of material generally increases with decreasing atomic number.

Boron nitride has highly anisotropic thermal expansion properties, one being much lower than most ceramic materials, and one much higher. Thus, using it in a matrix allows both circumferential and radial cracks to nucleate from the particle. BN also has excellent dielectric properties since it has a desired low dielectric constant, low loss tangent, and excellent resistance to change of these properties with temperature fluctuations. BN also has excellent ablation resistance.

Tests have shown the use of an $Al_2O_3$ matrix interspersed with small BN particles as extremely promising. Best results have been obtained when the $Al_2O_3$ particles comprise 30 to 90 percent of the composite and preferably 50 to 70 percent. Tests have shown that it is generally not practical to introduce more than 70 volume percent of boron nitride into the matrix, and frequently no more than 50 percent can be effectively used. Where greater strength or erosion resistance is required, lower volume percentages of BN are used, with a corresponding decrease in ablation resistance. Thus, it is seldom that the amount of BN used would be below 10 percent of the matrix.

The particle size of the BN particles is critical, best results being obtained when a plate-like particle, a commonly obtained form of BN powder particle having dimensions of the order of a few microns, is used. The particle sizes of the BN particles ranges substantially from 1 to 10 microns in dimension, with a preferred size being 3 to 5 microns. The thickness of the particles is preferably a small fraction of their dimension, of the order of 10:1. Using particles of this size makes it difficult to propagate large temperature differences arising from thermal shock through the material, and allows the composite to exhibit much greater mechanical strength than the prior art. The composites of Rossi display a mechanical strength of 5-20K psi, whereas the composites of this invention surprisingly have one along the order of 20-50K psi, all without any loss in thermal resistance. Although we do not wish to be bound by theory, it is believed that this is due to the difficulty in creating large microcracks in the instant invention, whereas the BN platlets employed in the composites of Rossi, due to their much greater size, create larger microcracks, which eventually weakens their resistance to mechanical strain.

The $Al_2O_3$-BN composite is made using conventional vacuum hot-pressing techniques; however, sintering may also be feasible. The desired volume percents of the BN and $Al_2O_3$ particles were wet-milled 60 minutes in an $Al_2O_3$ ball mill using isopropanol. The cakes were then decanted and air-dried at 120° C. The dried friable cake was lightly mortared and pestled. The resultant powder, loaded in graphite dies, was hot-pressed at 500° psi at 50 microns vacuum pressure at temperatures between 1750° C. and 1950° C. for times between 20 to 60 minutes. The resultant product was a composite that displayed high internal bonding between the $Al_2O_3$ and BN particle phases when cut by a diamond cutter.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A hot pressed ceramic composite possessing a high degree of resistance to failure from thermal fracture consisting essentially of from 10 to 70 volume percent of hexagonal boron nitride particles which have a plate-like shape of about 1–10 microns in dimension, with their thickness being a small fraction of their dimension, uniformly dispersed in a powdered alumina matrix of 30 to 90 volume percent.

2. A hot pressed ceramic composite as claimed in claim 1 wherein the boron nitride particles have a length-to-thickness ratio of about 10:1.

3. A hot-pressed ceramic composite as claimed in claim 2 wherein the boron nitride particles have a plate-like shape of 3 to 5 microns in dimension.

4. A hot-pressed ceramic composite as claimed in claim 1 wherein the boron nitride particles comprise 30 to 50 volume percent of the composite.

5. A hot-pressed ceramic composite as claimed in claim 2 wherein the boron nitride particles comprise 30 to 50 volume percent of the composite.

6. A hot-pressed ceramic composite as claimed in claim 3 wherein the boron nitride particles comprise 30 to 50 volume percent of the composite.

* * * * *